J. F. MERKEL.
SELF PROPELLED VEHICLE.
APPLICATION FILED DEC. 23, 1915.

1,290,277.

Patented Jan. 7, 1919.
4 SHEETS—SHEET 1.

INVENTOR
Joseph F. Merkel
BY
Henry D. Williams
ATTORNEY

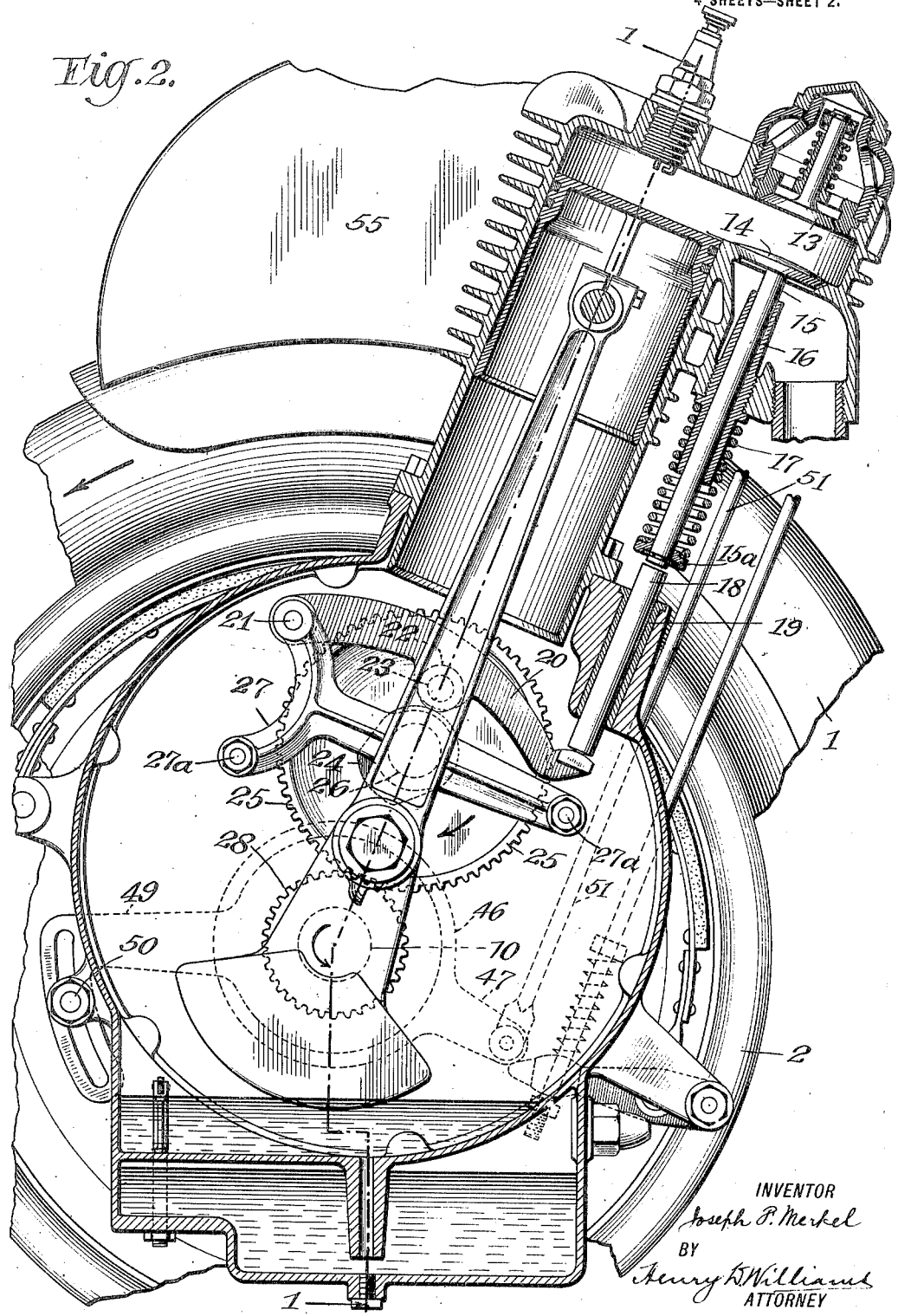

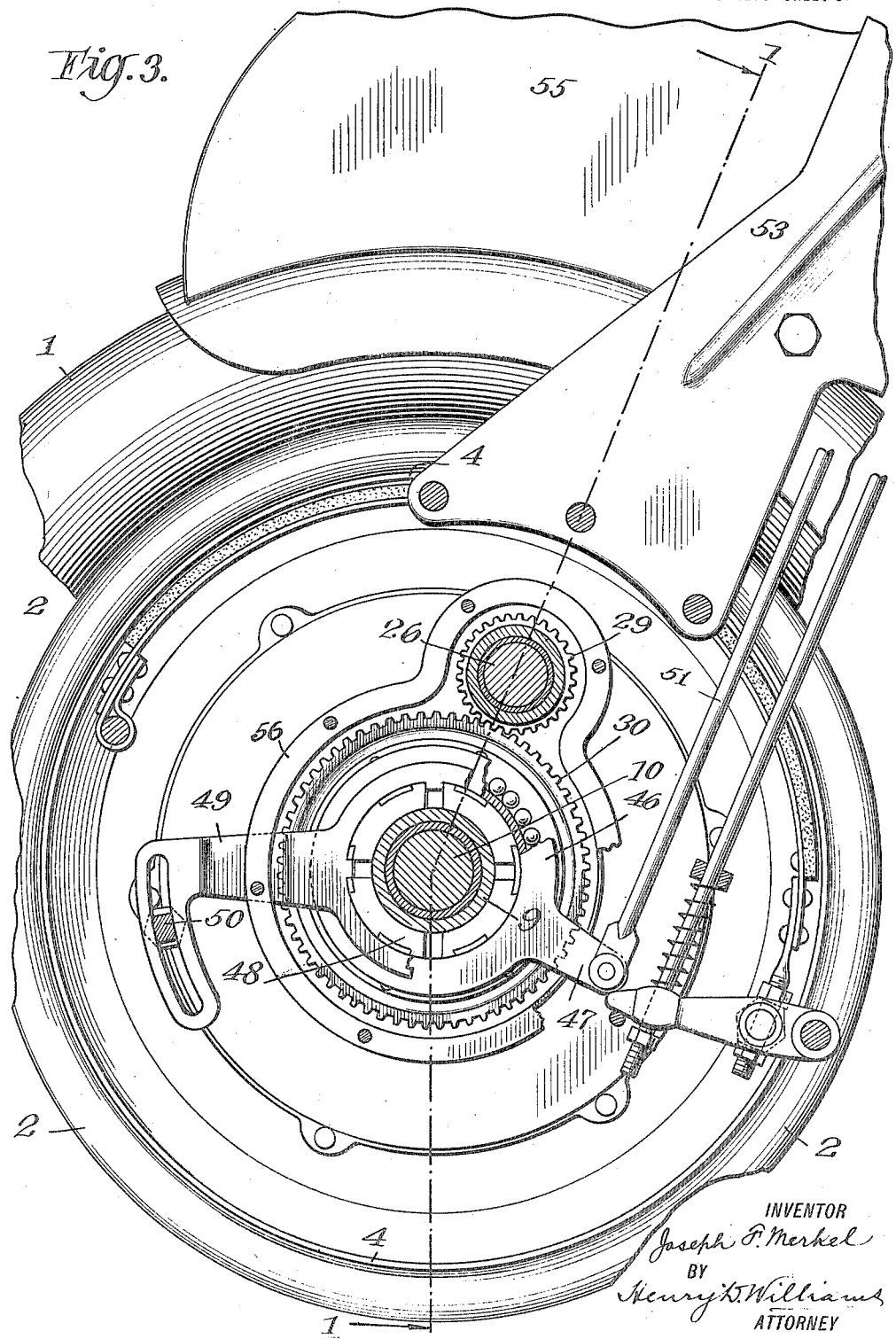

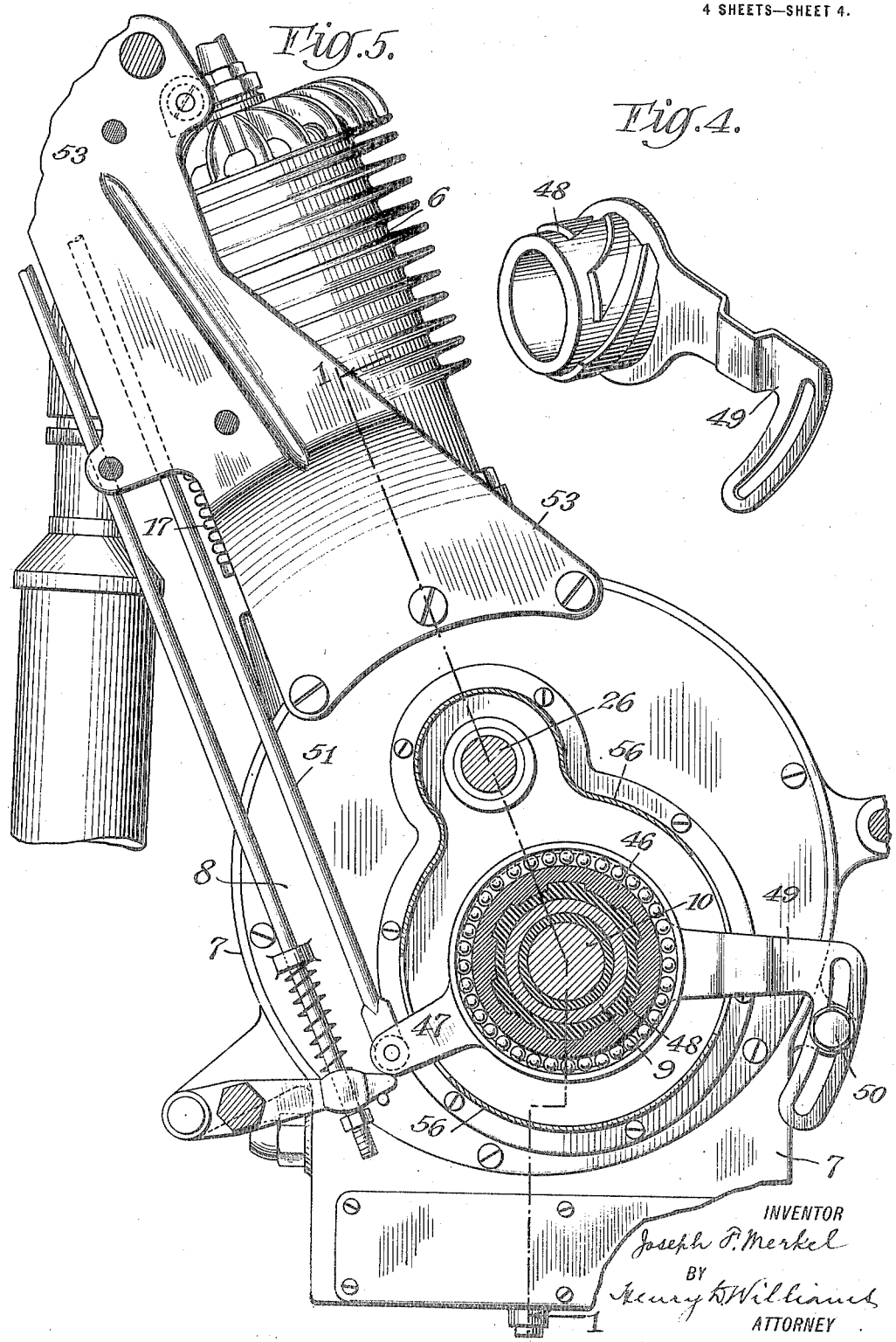

UNITED STATES PATENT OFFICE.

JOSEPH F. MERKEL, OF FLUSHING, NEW YORK.

SELF-PROPELLED VEHICLE.

1,290,277. Specification of Letters Patent. Patented Jan. 7, 1919.

Application filed December 23, 1915. Serial No. 68,344.

*To all whom it may concern:*

Be it known that I, JOSEPH F. MERKEL, a citizen of the United States, residing at Flushing, in the county of Queens and State of New York, have invented certain new and useful Improvements in Self-Propelled Vehicles, of which the following is a specification, reference being had therein to the accompanying drawings, forming part thereof.

My invention relates generally to self-propelled vehicles and is adapted more particularly to be embodied in vehicles of the cycle type in which two wheels are arranged in tandem, but it is to be understood that my invention is not necessarily restricted to vehicles of this type. General objects of my invention are small size, light weight, compactness, mobility, inexpensiveness and durability, and these objects may be summed up in a few words as improvements in vehicles of this type which render them highly practicable and workable. Other objects and advantages of my invention will hereinafter appear.

My present invention relates more particularly to improvements in the transmission mechanism, of a self-propelled or motor vehicle such as above mentioned. Two other applications filed on even date herewith and identified as Serial No. 68,343 and Serial No. 68,345 relate, respectively, more particularly to the controlling devices and to the lubricating means which are embodied in the same motor vehicle which forms the subject of the present application, and the subject matter of these other applications is in part disclosed in the drawings of the present application.

My present invention is directed to improvements in the transmission mechanism of a motor vehicle of the general type above mentioned and my invention includes certain features of construction and combinations of parts as will appear from the following description.

I shall now describe the self-propelled or motor vehicle embodying my invention which is illustrated in the accompanying drawings and shall thereafter point out my invention in claims.

Figure 1 is a partly inclined and partly vertical transverse section of the transmission mechanism, through the axis of a ground wheel of the vehicle taken substantially on planes indicated by the lines 1—1 of Fig. 2, 3 and 5, as viewed from the left in Figs. 2 and 3 and from the right in Fig. 5.

Fig. 2 is a longitudinal vertical section on a plane indicated by the lines 2—2 of Fig. 1 as viewed from the right.

Fig. 3 is a similar view on a plane indicated by the lines 3—3 of Fig. 1 as viewed from the right.

Fig. 4 is a perspective as seen diagonally from the front and right side of the vehicle of a stationary spirally threaded screw member or clutch worm together with its slotted adjusting lever.

Fig. 5 is a longitudinal vertical section on a plane indicated by the line 5—5 of Fig. 1 as viewed from the left.

Figure 1:
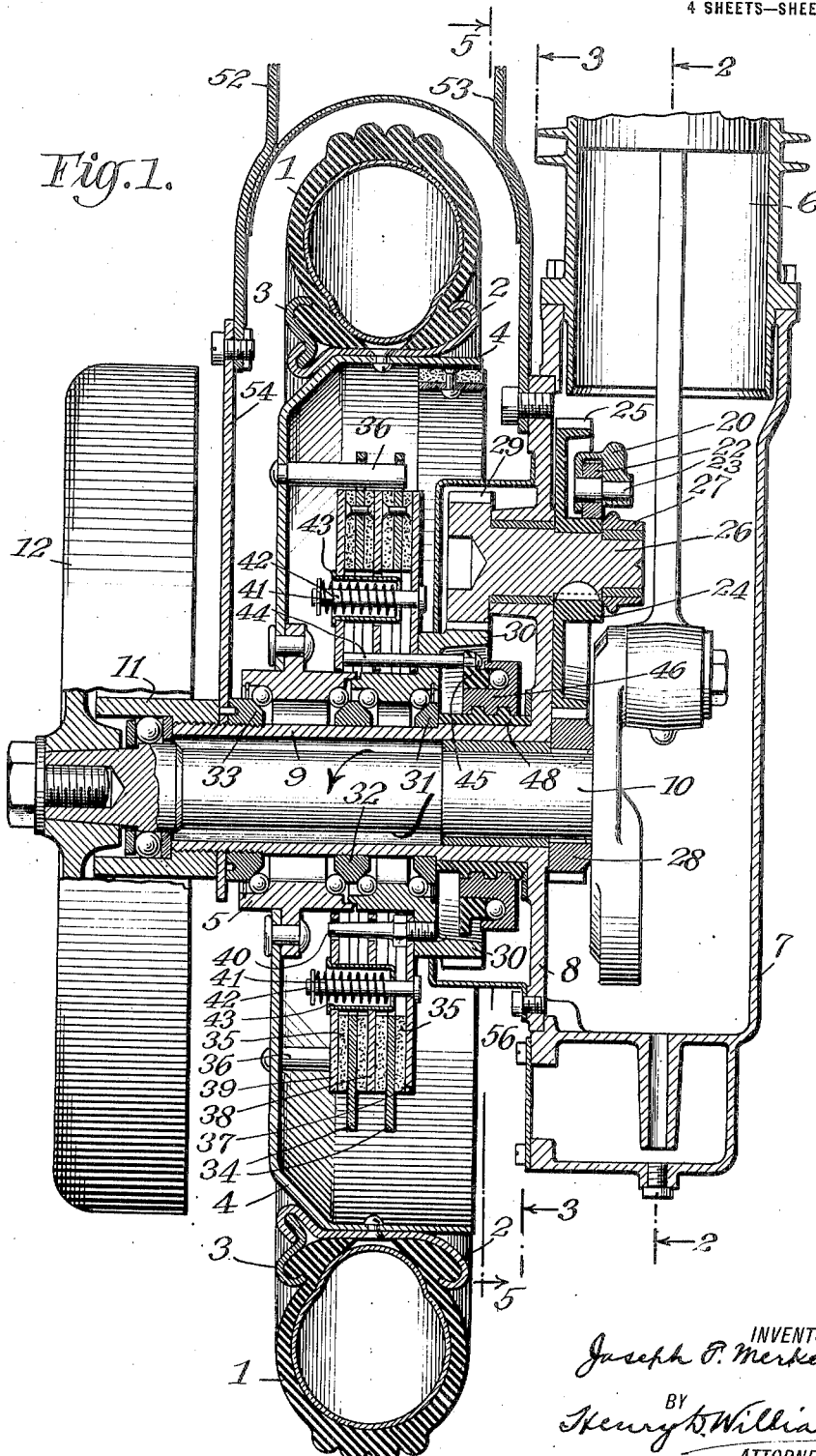

In the self-propelled vehicle embodying my invention illustrated in the accompanying drawings an engine-driven ground wheel is provided which, in this particular motor vehicle, is a front wheel and a steering wheel, but which so far as my present invention is concerned could as well be a rear wheel and need not be a steering wheel. This engine-driven ground wheel is shown as comprising a tire 1, a wheel rim 2 provided with a tire-retaining ring 3, a rim-carrying sheet metal drum or web 4 and a hub 5. An internal combustion engine is provided for driving the ground wheel and this ground wheel together with the transmission mechanism by which it is driven from the engine are mounted upon the engine frame. The engine has a cylinder 6 and has a frame including a crank case 7 and a strong crank case cover 8. The crank case cover 8 is provided with a long horizontally projecting bearing sleeve 9 upon which toward its outer end the hub 5 of the engine-driven ground wheel is rotatively mounted or journaled by means of ball bearings as shown in Fig. 1 of the drawings. The engine has a crank shaft 10 which extends through and is journaled in the bearing sleeve 9 which at the crank end or engine end of the crank shaft 10 is provided with a crank shaft bushing as shown in Fig. 1 and which at its outer end is provided with a ball bearing for the crank shaft 10, as shown, within a bearing ring 11 fixed upon and projecting beyond the end of the bearing sleeve 9. The projecting farther end of the crank shaft 10 is conveniently provided with a fly wheel 12 as appears in Fig. 1.

The engine cylinder 6 has a suction-operated spring-pressed inlet valve or puppet valve 13 of a usual kind, and also has a positively operated exhaust valve 14 provided with a usual valve stem 15 which is slidable in an exhaust valve guide 16. The lower end of the exhaust valve stem 15 is provided with a cap 15ᵃ between which and a shoulder shown as formed upon the guide sleeve 16 is interposed a valve-closing thrust spring 17. A valve opening jumper pin 18, in alinement with the exhaust valve stem 15, extends slidably through a bushing sleeve 19 to the interior or inside of the crank case 7 where it is adapted to be engaged and operated by a jumper lever 20 which is pivoted upon a jumper stud 21 projecting from the inside of the crank case cover 8 of the engine frame. The jumper lever 20 is provided near its middle with a cam roller 28 which is mounted upon a roller pin 23. An exhaust cam or exhaust valve operating cam 24, shown as formed upon the hub of a secondary gear 25, engages the cam roller 22 and imparts valve-opening movement to the jumper lever 20. The secondary cam-operating gear 25 is shown as fixed upon a short shaft or cam shaft 26 which is journaled in a bearing formed in the crank case cover 8 and also at its end within the crank case 7 is journaled in and further supported by a cam shaft spider 27 which, as appears in Fig. 2, is firmly secured by means of studs 27ᵃ and the pivot stud 21 to the inside of the crank case cover 8. The secondary gear or cam gear 25 is operated from the crank shaft 10 of the engine by means of a primary gear 28 which is of lesser diameter and correspondingly has a lesser number of teeth than the secondary gear 25 to the extent that the secondary cam-operating gear 25 will be rotated at one-half the rotative speed of the primary gear 28 and engine shaft or crank shaft 10.

It will now be understood that this exhaust mechanism just described will result in the proper timed opening of the exhaust valve 14 at each second rotation of the crank shaft 10 in the usual way as is well understood in the art. However, in my present invention the primary gear 28 and the secondary gear 25 form parts of the transmission mechanism for connecting the crank shaft 10 of the engine to the engine-driven ground wheel 1. The short cam shaft 26 of the secondary gear 25, which latter constitutes a valve-operating member, projects through its bearing to the outside of the crank case cover 8 and is there provided with an intermediate pinion gear 29 shown in the construction illustrated as formed upon and integral with the end of the short cam shaft 26. The intermediate pinion gear 29 engages or meshes with a clutch-driving power-applying gear 30 which is rotatively mounted by means of ball bearings, as appears in Fig. 1, upon the projecting bearing sleeve 9 of the crank case cover 8 of the engine frame. The power-applying or clutch-driving gear 30 is shown as having a hub portion projecting to one side and a toothed rim portion projecting to the other side of a connecting web portion as clearly appears in Fig. 1. The hub of the power-applying gear 30 is mounted alongside of immediately adjacent to the hub 5 of the engine-driven ground wheel and the ball bearings for the power-applying gear 30 and for the hub 5 include a stationary cone 31 shown as abutting against a shoulder formed on the bearing sleeve 9, a middle floating cone 32 and an adjusting cone 33 beyond the ground wheel hub 5. It will now be understood that the power-applying gear 30 will be driven at a reduced rate of speed from the engine shaft 10 through the intermediary of the primary gear 28, the secondary cam gear 25, the cam shaft 26 and the intermediate pinion gear 29, it being noted that the power-applying gear or clutch-driving gear 30 is concentric with the axis of the engine shaft 10 and its primary gear 28.

A friction clutch operated by end thrust is provided for connecting the power-applying gear 30 to the engine-driven ground wheel, and this clutch is shown as a multiple disk clutch which is located within the rim 2 and other peripheral portions of the ground wheel and partly surrounding the hub 5 and also surrounding the hub of the power-applying gear 30, the web of the wheel drum 4 being at the right side of the vehicle from the clutch and this drum opening toward the engine side or left side of the vehicle as appears in the several figures of the drawings. The clutch has a set of annular disks or shoe plates 34, shown as two in number, each of which is provided on its opposite faces with heat-resisting friction rings 35 of suitable material such as asbestos fiber, and these shoe plates 34 are anchored to or coupled to the web portion of the drum 4 by means of wheel-driving anchor studs 36 which are rigidly carried by the web of the drum 4 and which pass freely or slidably through outwardly projecting ears or extensions of the shoe plates 34, and these wheel-driving studs 36 may be of any suitable number, for example six, as appears in the drawings. The clutch has a set of three driving plates, a front plate 37, a middle plate 38 between the two shoe plates 34, and a back plate 39. The clutch driving plates 37, 38 and 39 are all coupled to or rotatively connected to the web of the power-applying gear 30 by means of clutch-driving studs 40. The clutch-driving studs 40 which, in the construction illustrated, are six in number, are screwed into the web of the power-applying gear 30 and have shoulders which clamp the front clutch-driving plate 37 against the back shoulder formed by the web of the power-applying gear 30, but the middle driving plate 38 and the back driving plate 39 are mounted to slide freely upon the driving studs 40 which pass loosely through them. The clutch shoe plates 34 and the clutch driving plates 37, 38 and 39 are spring-pressed into engaging relation by coiled thrust springs 41 which surround pins or bolts 42, which in the construction illustrated are six in number and which have heads at the outside of the front driving plate 37, the clutch springs 41 acting between abutment washers or caps upon the other ends of the pins 42 and the bottoms of spring cups 43 which are flanged over the back driving plate 39 and pass freely through sufficiently large holes or openings in the middle driving plate 38 and in the two shoe plates 34 as clearly appears in Fig. 1 of the drawings.

The unrestrained pressure of the clutch springs 41 is sufficient that under operating conditions there will be no slippage between the shoe plates 34 and the driving plates 37, 38 and 39, but the shoe plates 34 and consequently the ground wheel to which they are connected, will rotate together with and at the same speed as the clutch driving plates 37, 38 and 39 which, of course, will be at the same speed as the power-applying gear 30. Disengagement of the clutch is effected by removing the pressure of the driving plates 37, 38 and 39 upon the shoe plate 34 and this is effected by means of clutch-disengaging push pins 44 which abut or rest at their free ends upon the back driving plate 39 and which pass freely through the middle driving plate 38 and the front driving plate 37 and also pass freely and slidably through the web of the power-applying gear 30. These clutch-disengaging push pins 44 carry at their outer ends a clutch-disengaging ring or push plate 45 having a flange through which the ends of the push pins 44 are shown as riveted, these push pins 44 also being six in number in the illustrated construction. The push plate or thrust ring 45 is adapted to be moved inward to disengage the clutch by means of a rotative clutch-disengaging screw member or worm nut 46 between which and the ring 45 bearing bolts are shown as provided, being shown as seated in a ball race formed on the screw member 46. The rotative-clutch disengaging screw member or nut 46 is provided with an operating arm or lever arm 47 which projects rearward and slightly downward as appears in Figs. 2, 3 and 5 of the drawings.

The thrust-applying clutch-disengaging worm nut 46 is spirally rotative upon a stationary clutch worm or thrust worm 48 which is mounted upon the engine frame sleeve 9 between the stationary bearing cone 31 of the clutch-driving power-applying gear 30 and the crank case cover 8 of the engine frame. The stationary screw member or thrust worm 48 of the clutch is rotatively adjustable upon the sleeve 9 by means of a comparatively thin sheet metal clutch-adjusting lever 49 which fits over the end of the thrust worm 48 adjacent to the outer surface of the crank case 8 and which is provided with inwardly projecting lugs which enter notches, shown as four in number, in the end of the clutch worm 48 as most clearly appears in Fig. 3 of the drawings. The adjusting lever 49 of the clutch worm 48 is shown as projecting forward and at its free end extends downward and is there provided as shown with an arcurate slot, and this slotted end of the adjusting lever 49 is adjustably anchored to a lug on the crank case 7 by means of a bolt 50 as clearly appears in the drawings, particularly in Figs. 2 and 5. It should be noted that the spirally interengaging worm threads of the rotative clutch-disengaging worm nut 46 and of the adjustable stationary thrust worm 48 are left hand threads, as clearly appears in the illustration of the thrust worm 48 in Fig. 4, these worm threads in the construction illustrated in the drawing being of one-half pitch or at an angle of 45° as also appears in Fig. 4 of the drawings.

It will now be clear that the counter-clockwise rotation imparted to the worm nut 46 as viewed from the left in Fig. 1 and as seen in Figs. 2 and 3, and the corresponding clockwise rotation of the worm nut 46 as viewed in Fig. 5, will result in clutch-disengaging thrust being applied by the worm nut 46 to the thrust ring 45 and the push pins 44 carried thereby. It will also be equally well understood that rotation of the worm nut 46 in the opposite direction or in a clockwise direction as viewed in Figs. 2 and 3 and from the right in Fig. 1 will relieve the clutch-disengaging thrust from the thrust ring or push plate 45 and from the push pins 44 and will permit the clutch springs 41 to clamp the shoe plates 34 between the driving plates 37, 38 and 39, so that driving power will be transmitted from the power-applying gear 30 through the clutch to the web 4 of the engine-driven ground wheel.

In this connection it is to be noted that it has been found by practical experience that in intermediate positions of the worm nut 46 the clutch will drive the ground wheel with a certain amount of slip, the power-applying gear 30 in such cases rotating at a higher rate of speed than the ground wheel to which the power is transmitted by the slipping clutch. This is of advantage under certain conditions by reason of permitting the engine to run at normal speed and avoiding stalling thereof while the vehicle proceeds at a slow pace, for example in climbing hills.

It will be noted that upward movement of the rearwardly projecting lever arm 47 will impart clutch-disengaging rotation to the worm nut 46 and that downward movement of this lever arm 47 will impart clutch-engaging rotation to the worm nut 46. An upwardly and rearwardly extending operating rod 51 is pivoted to the end of the lever arm 47 of the rotative worm nut 46, and so far as the present invention is concerned, this operating rod 51 may be operated by any suitable operating device or controlling means.

The assembled unit including the engine, the transmission mechanism and the ground wheel, is adapted to be connected to or supported upon the vehicle by means of right and left fork sides 52 and 53 respectively, the left fork side 53 being bolted as shown to the upper edge of the crank case cover 8 of the engine frame, and the right fork side 52 being shown as provided with an extension end piece 54 shown as bolted thereto and which at its lower end passes over the bearing sleeve 9 of the engine frame and is clamped between the adjustable bearing cone 33 and the end bearing ring 11, as clearly appears in Fig. 1 of the drawings. A fuel tank 55 for the engine may be conveniently carried by the fork sides 52 and 53 above the engine-driven ground wheel as indicated in Figs. 2 and 3. A gear cover 56, as appears in Figs. 1 and 5, is provided for the pinion gear 29, power-applying gear 30 and clutch screw members 46 and 48, and is shown as fastened by means of screws to the crank case cover 8.

It is obvious that various modifications may be made in the construction shown in the drawings and above particularly described within the principle and scope of my invention.

I claim:

1. In a self-propelled vehicle, a frame having two fork sides, a fixed sleeve rigidly attached to each of said sides, a ground wheel rotatably mounted on the outside of said sleeve, an engine shaft within said sleeve, and mechanism connecting said engine shaft with said ground wheel.

2. In a self-propelled vehicle, a frame having two fork sides, a fixed sleeve rigidly connected with each of said sides, an engine shaft extending through said sleeve and bearing a driving pinion at one end of said sleeve, a ground wheel between said sides rotatably mounted upon the outside of said sleeve, a power-applying member mounted upon the outside of said sleeve, a friction clutch adapted to connect said ground wheel and said power-applying member, and mechanism connecting said power-applying member with said driving pinion.

3. In a self-propelled vehicle, a frame having two fork sides, an engine casing rigidly attached to one of said sides, a fixed sleeve extending from said engine casing to the other of said sides, an engine shaft extending through said sleeve, a ground wheel mounted upon the outside of said sleeve, and mechanism connecting said engine shaft with said ground wheel.

4. A self-propelled vehicle having, in combination, an engine-driven ground wheel, an engine for driving the ground wheel, the engine having a frame provided with a projecting sleeve upon which said ground wheel is mounted, and transmission mechanism for connecting the engine to the ground wheel, the transmission mechanism including a gear rotatively mounted on the projecting journal member of the engine frame, and a clutch for rotatively connecting the gear to the ground wheel.

5. A self-propelled vehicle having, in combination, an engine-driven ground wheel, an engine for driving the ground wheel, the engine having a frame provided with a projecting sleeve upon which the ground wheel is rotatively mounted, and transmission mechanism for connecting the engine to the ground wheel, the transmission mechanism including a gear also rotatively mounted on the projecting journal member of the engine frame, and a clutch for rotatively connecting the gear to the ground wheel.

6. A self-propelled vehicle having, in combination, an engine-driven ground wheel, an engine for driving the ground wheel, the engine having a frame on which the ground wheel is journaled and having a crank shaft concentric with the axis of the ground wheel, and transmission mechanism for connecting the engine to the ground wheel, the transmission mechanism including a primary gear carried by the crank shaft, a power-applying gear for the ground wheel concentric therewith, intermediate gears journaled on the engine frame, and a clutch between the power-applying gear and the ground wheel for rotating the latter with the former.

7. A self-propelled vehicle having, in combination, an engine-driven ground wheel, an engine for driving the ground wheel, the engine having a frame provided with a projecting sleeve upon which the ground wheel is rotatively mounted and having a crank shaft journaled in the sleeve, and means for connecting the engine to the ground wheel including a power-applying gear also rotatively mounted on the sleeve of the engine frame, a primary gear carried by the crank shaft, intermediate gears journaled on the engine frame, and a clutch within the peripheral portions of the ground wheel for connecting the power-applying gear to the ground wheel.

8. A self-propelled vehicle having, in combination, an engine-driven ground wheel, an engine for driving the ground wheel, the engine having a frame provided with a projecting journal member upon which the ground wheel is rotatively mounted and also having a crank shaft concentric with the axis of the ground wheel and a rotative valve-operating member journaled on the engine frame and rotated from the crank shaft at one-half the rotative speed of the latter, a power-applying gear for the ground wheel also rotatively mounted on the projecting journal member of the engine frame, a gear rotative with the valve-operating members for driving the power-applying gear, and a clutch within the peripheral portions of the ground wheel for connecting the power applying gear to the ground wheel.

9. A self-propelled vehicle having, in combination, an engine-driven ground wheel, an engine for driving the ground wheel, the engine having a frame on which the ground wheel is journaled, and means for connecting the engine to the ground wheel, such means including a power-applying member journaled on the engine frame concentric with the axis of the ground wheel, a clutch operative by end thrust to connect the power-applying member to the ground wheel or to disconnect it therefrom, and means for applying clutch-operating end thrust including a clutch-operating rotative thrust member concentric with the axis of the ground wheel, and a stationary thrust member with which the rotative thrust member is co-operative.

10. A self-propelled vehicle having, in combination, an engine-driven ground wheel, an engine for driving the ground wheel, the engine having a frame on which the ground wheel is journaled, and means for connecting the engine to the ground wheel, such means including a power-applying member journaled on the engine frame concentric with the axis of the ground wheel, a clutch operative by end thrust to connect the power-applying member to the ground wheel or to disconnect it therefrom, and means for applying clutch-operating end thrust including a stationary screw member on the engine frame concentric with the axis of the ground wheel and a rotative thrust-applying screw member coöperative with the stationary screw member.

11. A self-propelled vehicle having, in combination, an engine-driven ground wheel, an engine for driving the ground wheel, the engine having a frame provided with a projecting bearing sleeve upon which the ground wheel is journaled and having a crank shaft journaled in the bearing sleeve, a power-applying gear also journaled on the bearing sleeve of the engine frame, gears connecting the crank shaft to the power-applying gear, a multiple-disk clutch normally spring-pressed to engaged condition and having one set of plates anchored to the ground wheel and another set of plates anchored to the power-applying gear, a stationary thrust worm rotatively adjustable on the bearing sleeve of the engine frame, a thrust-applying worm nut rotative on the worm for producing clutch-releasing end thrust, clutch-releasing thrust pins guided by the power-applying gear, and a thrust ring carried by the thrust pins and engaged by the thrust-applying worm nut.

In testimony whereof I have affixed my signature.

JOSEPH F. MERKEL.